United States Patent [19]

Millheim

[11] Patent Number: 4,794,534
[45] Date of Patent: Dec. 27, 1988

[54] METHOD OF DRILLING A WELL UTILIZING PREDICTIVE SIMULATION WITH REAL TIME DATA

[75] Inventor: Keith K. Millheim, Tulsa, Okla.
[73] Assignee: Amoco Corporation, Chicago, Ill.
[21] Appl. No.: 764,261
[22] Filed: Aug. 8, 1985
[51] Int. Cl.⁴ .................... E21B 44/00; G06G 7/48; G05B 17/02
[52] U.S. Cl. .................... 364/420; 364/578; 73/151; 175/40
[58] Field of Search .............. 364/420, 422, 578, 149, 364/150; 73/151; 175/40

[56] References Cited

U.S. PATENT DOCUMENTS

| | | | |
|---|---|---|---|
| 3,971,926 | 7/1976 | Gau et al. | 364/602 |
| 4,210,964 | 7/1980 | Rogers et al. | 364/578 |
| 4,370,717 | 1/1983 | Hummert et al. | 364/578 X |
| 4,555,756 | 11/1985 | Yamanaka | 364/578 X |
| 4,559,610 | 12/1985 | Sparks et al. | 364/578 X |

FOREIGN PATENT DOCUMENTS 0760130 8/1980 U.S.S.R. .............. 364/578

OTHER PUBLICATIONS

Hollander, C. R. et al., "The Drilling Advisor", *IEEE Proceed. of Trends and Applications* 1983 Automating Intelligent Behavior, Applications and Frontiers, May 1983, 28–32.

Hollander, C. R. et al., "The Drilling Advisor: An Expert System Application", *Digest of Papers Spring Compcon* 83, Feb.–Mar., 1983, 116–119.

Records, L. R. et al., "A Drilling Training Simulator Using Distributed Microprocessor System", *SCS*, 1983, 80–84.

Primary Examiner—Jerry Smith
Assistant Examiner—Clark A. Jablon
Attorney, Agent, or Firm—S. H. Brown; F. E. Hook

[57] ABSTRACT

A method and related apparatus are disclosed for drilling a well including providing drilling data, which can include drilling rig parameters, geological parameters, wellbore parameters, and drillstring parameters, on a real time basis from at least one well into a database associated with a programmable digital computer. The drilling data can be provided via telephone lines, hard wire connections, radio transmissions, microwave transmissions or fiber optical transmissions into the database. Associated with the database is a monitoring facility where drilling activities are monitored and, if desired, future drilling actions are simulated utilizing the drilling data within the database.

11 Claims, 8 Drawing Sheets

METHOD OF DRILLING A WELL UTILIZING PREDICTIVE SIMULATION WITH REAL TIME DATA

BACKGROUND OF THE INVENTION

1. Field of the Invention

The present invention relates to a method and related apparatus for drilling a well and, more particularly, to such a method and apparatus that includes providing drilling data, on a real time basis, from at least one well site into a database, and then simulating future drilling activities for that well at least one utilizing the well's drilling data within the database.

2. Setting of the Invention

An ever present problem in the drilling of a well is providing efficient and effective supervision or monitoring. While drilling a well, the borehole conditions can change extremely quickly or other conditions can change so slowly that trends are difficult to identify. Both of these situations pose special problems in supervising and monitornng the drilling of a well.

Further, the drilling industry is having to go operate in remote locations often with severe weather conditions to find oil and gas. In these locations, drilling crews oftentimes work very long hours. Thus, there is a high potential for mistakes. In the drilling of a well, even minor mistakes can become major problems; therefore, it is increasingly important to find means to aid in the supervision and monitoring of the drilling activity.

Prior methods used to overcome these problems include, obviously, having a "fresh" and experienced engineer on each well site at all hours to supervise and make decisions. However, the industry has experienced personnel and planning problems with this method.

Teleconferencing, such as using video cameras/monitors, as well as audio equipment obviously provides an excellent source of two way visual and audio communication from an expert at a central facility to the well site; however, in a drilling situation, the problem of having the expert not being able to utilize up-to-date and accurate drilling data in a useful format is still present.

NL-Baroid Company and X-Log Corporation provide a service of telexing or using microwave communication to transmit drilling data from at least one well site to a remote supervising and monitoring facility. One such operation is described in "Data System Tightens Tenneco Gulf Operations," Oil and Gas Journal, Sept. 10, 1984, p. 170. However, the service provided by either X-Log or NL-Baroid does not include the capability of providing drilling data from a well, on a real time basis, into a digital computer's database, which can be used to simulate future drilling activities on that well.

A parallel problem to the need for better supervision is the need for having experienced decision makers in communication with the people at the well site to answer questions and give direction or focus at appropriate times. In the drilling of a well, there are usually only one or two experienced decision makers, such as the drilling foreman, either onsite or in direct communication with the well site. Again, because of the remote locations, harsh weather and long hours, these decision makers sometimes are not at their best, therefore their decisions can be suspect. For example, if the well drills into a high pressure gas zone, measures need to be taken fairly quickly to prevent a blowout. There are many different ways to "kill" a blowout, but which is best? The decision maker onsite may not have any experience in solving such a problem. As described previously, the wrong decision can result in a large monetary loss or serious injury or death. To help the decision maker, various analytical devices have been developed to simulate the effects of a certain drilling action. These devices are commonly programmable digital computers with simulation or modeling software programs, as is well known. The problem with using these types of simulators is that for meaningful simulation results, accurate and up-to-date data needs to be inputted, as variables, into the computer. Most such simulators can only model very specific activities, but one choice may be a poor choice for a totally unrealized reason, i.e., the simulator is not interactive with other simulators used to simulate other specific activities. Further, the time required to input all of the data into the computer may not be available in an emergency situation. Another problem is that the analytical devices are usually large mainframe computers. For cost, logistical and maintenance reasons, a mainframe computer has not been provided at each well site. To the inventors knowledge, no prior system has ever been developed to send data from a well being drilled to an analytical device for use by personnel at the well.

One such analytical device or simulator is entitled "The Engineering Simulator for Drilling (ESD)," which provides the capability of simulating very complex interactive drilling actions. The ESD was developed by Amoco Production Company and is described more fully in the following articles, which are herein incorporated by reference:

"An Engineering Simulator for Drilling: Parts 1 and 2," by Keith K. Millheim and R. L. Huggins, SPE Nos. 12075 (1983) and 12210.

"Planning and practical problem solving Using an Engineering Simulator for Drilling," by J. F. Brett and M. A. Summers, SPE No. 13206 (1984).

"Geology Drilling Log (GDL): A Computer Database System for Drilling Simulation," by E. C. Onyia, SPE No. 13113 (1984).

"Solids Control Design and Analysis Using an Engineering Simulator for Drilling," by D. B. Skidmore and C. T. Anderson, SPE No. 13438 (1985).

"Economic Analysis of Drilling Plans and Contractors by Using a Drilling Systems Approach," by W. W. Reynolds, SPE No. 13466 (1985).

"Use of the Engineering Simulator for Drilling for Evaluating and Designing Drill Rigs," by J. F. Brett and D. L. Yoder, SPE No. 13480 (1985).

The ESD, as described in these publications, only provides means for preparing a drilling plan. Nowhere is it disclosed or suggested to utilize an engineering simulator, such as the ESD, in a manner so that drilling data is provided, on a real time basis, from at least one well site into a computers database (associated with the ESD) so that future drilling actions for the well can be simulated utilizing the drilling data from the well in the database.

SUMMARY OF THE INVENTION

The present invention has been developed to overcome the foregoing problems and meet or exceed the above-identified needs. The present invention provides a method of drilling a well utilizing predictive simulation which includes providing on a real time basis drilling data from at least one well site into a database, and then simulating future drilling actions for the well utilizing the drilling data within the database. The methods and related apparatus, described hereinafter in greater detail, provide a novel approach to solving the foregoing problems. Specifically, the overall "system" provides means for having experts on a rotating basis 24 hours a day supervising and monitoring one or more wells. More specifically, a monitoring facility has been developed with the capability of two way voice, audio and data communication with one or more well sites. Within the monitoring facility, the data from the well site is displayed in a graphical format, for ease of comprehension, and is fed on a real time basis into a programmable digital computers database to which is connected a simulator, such as the ESD.

Besides the monitoring and supervising capabilities provided by the present invention, a vastly improved simulation, i.e., decision enhancement, tool, has been developed. By providing drilling data on a real time basis to the engineering simulator, future actions at the well can be simulated immediately if necessary. Also, the speed of the simulation can be slower than real time or even much faster than real time.

An important aspect of the present invention is that of the "total system" concept or drilling methodology. Drilling data is sent to a data base from all wells being monitored or have been monitored. Thus, the simulation from the present invention includes the experiences from more than one well and will be more accurate than if based on only one well. For example, a single drilling engineer has only his experience to draw upon, yet with the present invention he can access the data base, which provides him with experiences from all over the world and from many wells. Therefore, the system "learns", not just a single drilling engineer.

DETAILED DESCRIPTION OF THE PREFERRED EMBODIMENTS

The present invention provides a method and related apparatus for drilling a well comprising: providing, on a real time basis, drilling data (from at least one well being drilled) into a database associated with a digital computer, and then simulating future drilling action utilizing the digital computer and the drilling data within the database. Further, the present invention provides a means for remotely monitoring (via two way video, audio and data communication) the drilling activities of one or more wells.

Figure 1:
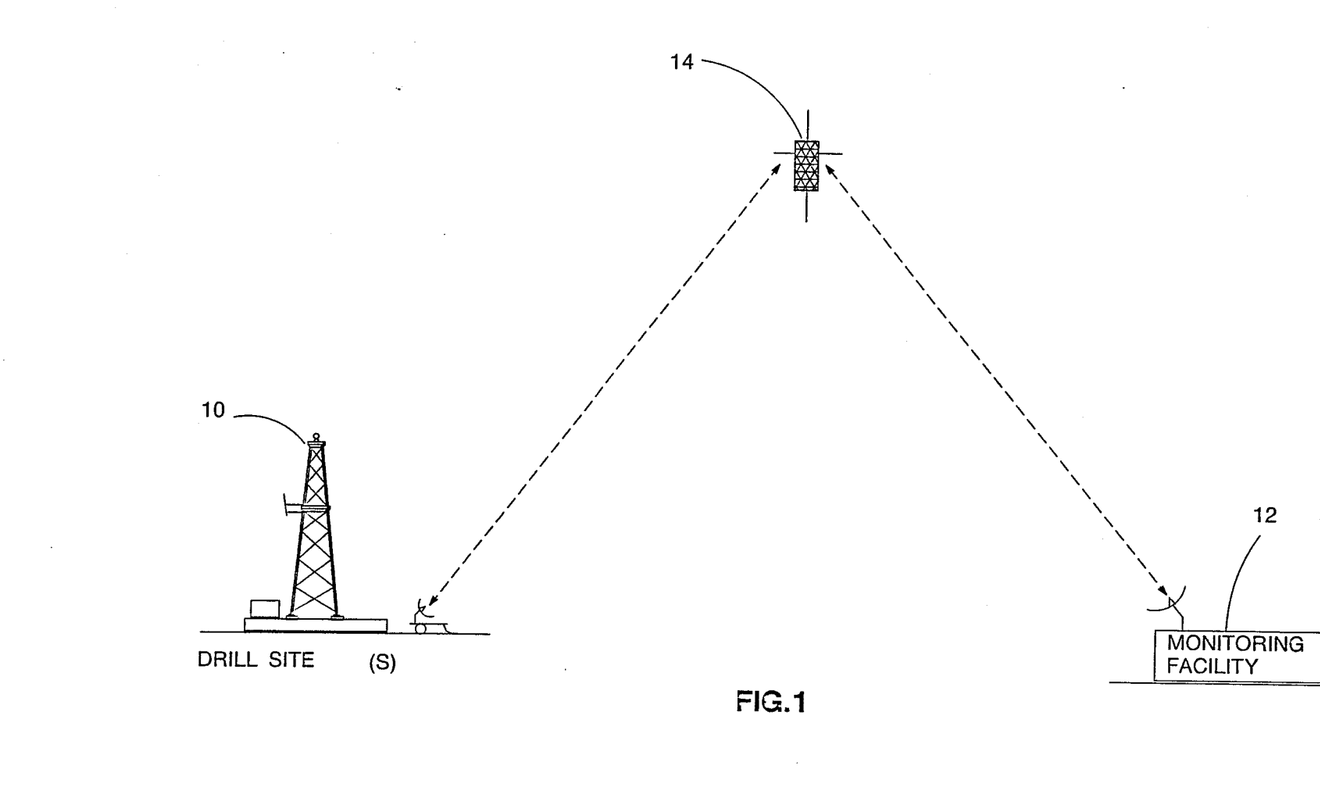
FIG. 1 is a diagrammatic representation of a drill site being in communication with a remotely located monitoring facility, in accordance with one embodiment of the present nnvention.

Drilling data from a well site 10 (FIG. 1) is sent to a monitoring facility 12, which can be adjacent the well site 10 or if remotely located is in communication via a communication link, such as a satellite 14. The use of the present method and related apparatus can be better understood by referring to the flow chart of FIGS. 2A and 2B. At the start, a drilling plan for a well is developed. Such plan includes the particular solids equipment to be used, the type of drill bits to be used, as well as many other drilling equipment and procedural determinations, as is well known in the art. Most commonly, a drilling plan is developed by a drilling engineer however, for the purposes of the present discussion a drilling plan is developed using a programmable digital computer, such as the Engineering Simulator-Drilling (ESD) developed by Amoco Production Company.

It should be noted that any means of developing a drilling plan can be utilized with the present invention and the development of the drilling plan forms no part of the present invention. In the flow chart (FIGS. 2A and 2B), the drilling plan is implemented at the drill site, in a manner well known in the industry. In this particular case though, signals representing different drilling parameters, such as bit RPM, weight-on-bit (WOB), and the like, as well as audio and visual information is provided on a real time basis to a monitoring facility, as will be described in more detail herein below. At the monitoring facility, the drilling data and the drilling activities are continuously monitored by at least one resident expert. As the drilling progresses, the drilling data is compared to what is expected from the drilling plan. In some circumstances, the drilling is not proceeding as planned, i.e., the drilling data is different from that anticipated. In such case, variance indicators, such as alarms, at the well site and/or the monitoring facility can be activated.

Figure 2A:
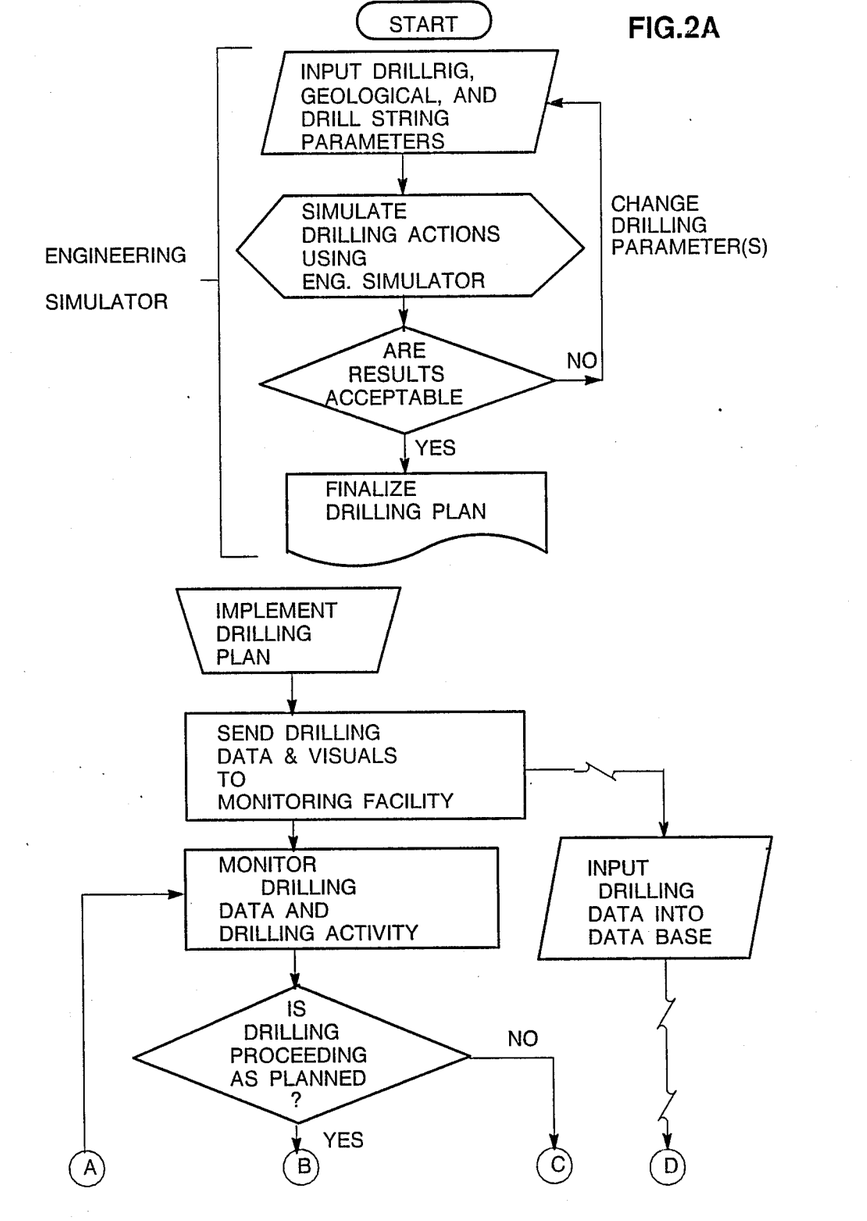
FIGS. 2A and 2B taken together form a chart of the process of planning and monitoring drilling activity, in accordance with one embodiment of the present invention.
Figure 2B:
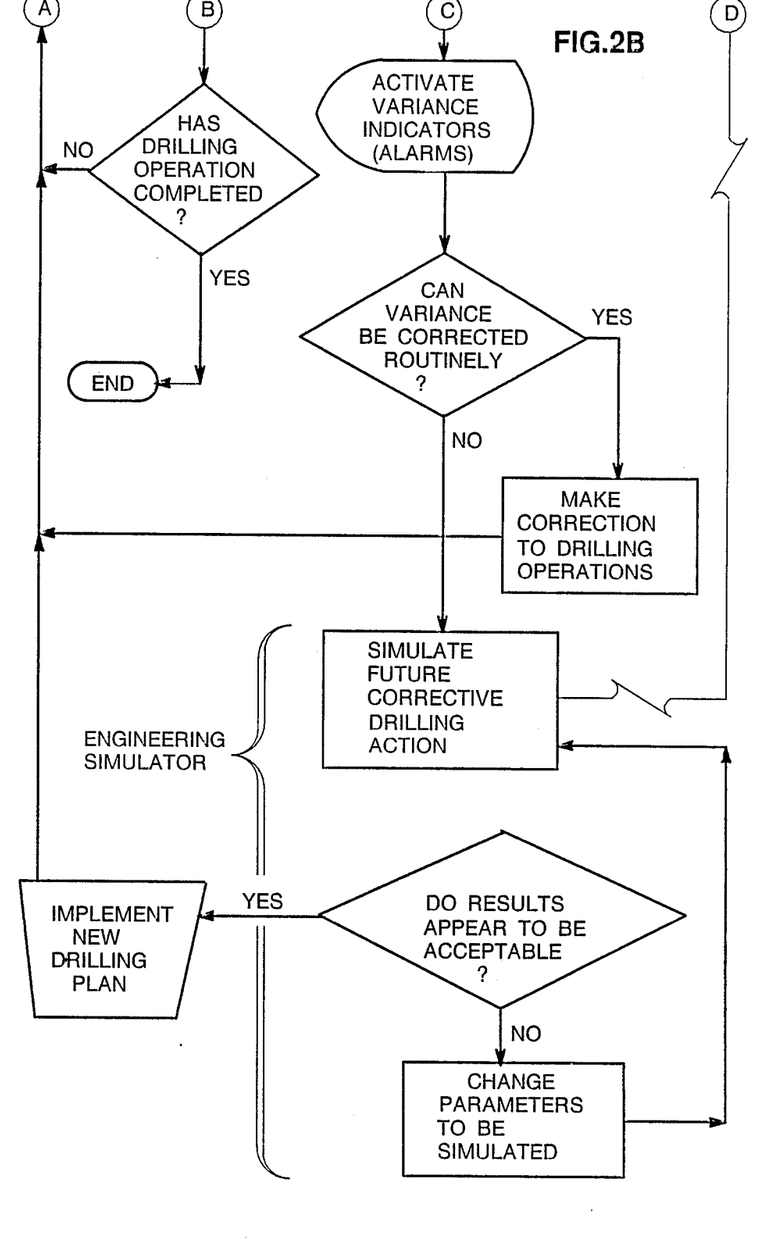

The question is then asked, can this variance in the drilling activity be corrected routinely, for example, closing or opening a valve, adding more weight-on-bit, or the like. If such variance can be corrected routinely, then the necessary corrective actions are made, as is well known, and the drilling activity continues. In the event that the variance cannot be corrected routinely, then there is a need for developing some corrective action(s). Such corrective action(s) can be developed by the drilling engineer at the well site alone or in conference with other engineers at the monitoring facility. Once the corrective action(s) has been developed, it can be implemented immediately or tested, first, to find if such action will truly solve the problem(s) at hand. Such testing can be accomplished through the use of computer aided simulation packages that model different specific features of the problem or solution. For the purposes of the present invention, an engineering simulator, and specifically the ESD, is utilized to simulate the future drilling actions.

The engineering simulator's results are reviewed to see if they are acceptable, if not, then the engineer can change certain of the parameters of the simulation and continue to simulate as before. Thereafter, the engineer determines which corrective action is best to solve the problem. The correction action is then communicated to the well site and the drilling proceeds in accordance with the new/modified drilling plan.

Upon receipt of the drilling data at the monitoring facility, a portion or all of the drilling data is sent on a real time basis, i.e., "as it occurs," or at predetermined intervals into a database which is operatively in communication with a programmable digital computer, such as the ESD. It is important to understand that while corrective drilling action has been determined in the past by an engineer or computers, no future (corrective) drilling action for a well has been developed and simulated utilizing drilling data from that well sent on a real time basis, to provide the best available data from which the best available simulation can be made for that well for that well.

Figure 3:
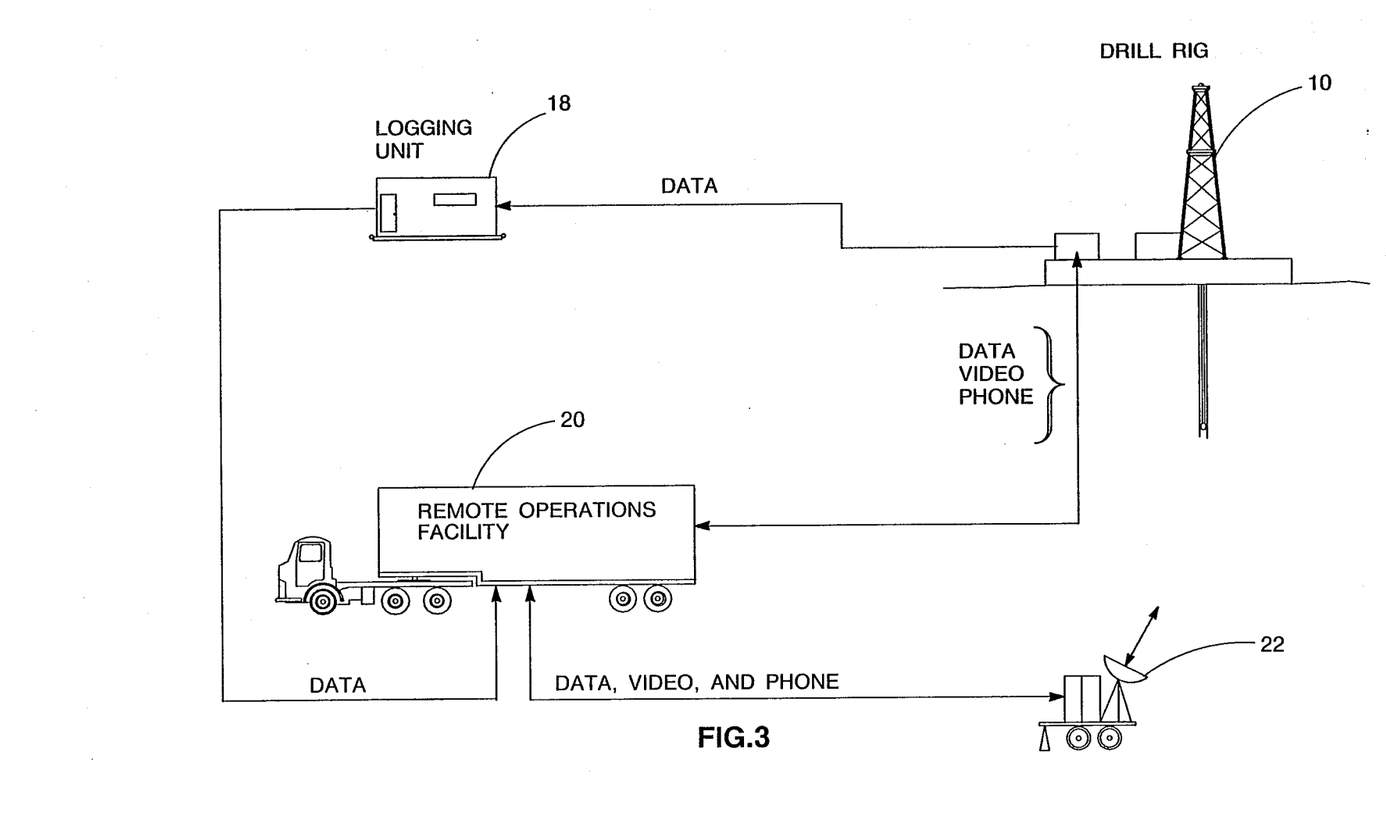
FIG. 3 is a semidiagrammatic elevational view of equipment utilized at a well site for use with one embodiment of the present invention.

The present invention can be divided into two major components: the well site equipment and the monitoring facility. As is shown in FIG. 3, a plurality of sensors (detailed later) are placed on or about the drill rig and related equipment. All of these devices send their respective electronic signals to a logging unit 18, which can be any "mud logging system" which is commercially available to collect and transmit data to location at the well site or to a remote location. The data that has been collected is then sent to a remote operations facility 20, which can be either a permanent structure or (as pictured) a mobile structure, wherein the data is reviewed as well as quality controlled.

Also, placed about the well site are a plurality of telephones, microphones, speakers, cameras and computer terminals. All of the electronic signals from the well site is sent from the remote operations facility 20 via any commercially available communication mechanisms to a monitoring facility 12. As shown in FIG. 3, a transportable satellite transceiver 22 is utilized as the communication mechanism. However, any other form of communication mechanism can be utilized between the remote operations facility 20 and the monitoring facility 14. Such mechanisms can be in the form of hardwire or coaxial cable connection, fiber optic communication systems, microwave transceiver systems, radio transmission and receiver systems, including the illustrated satellite transcriber system 22.

Figure 4:
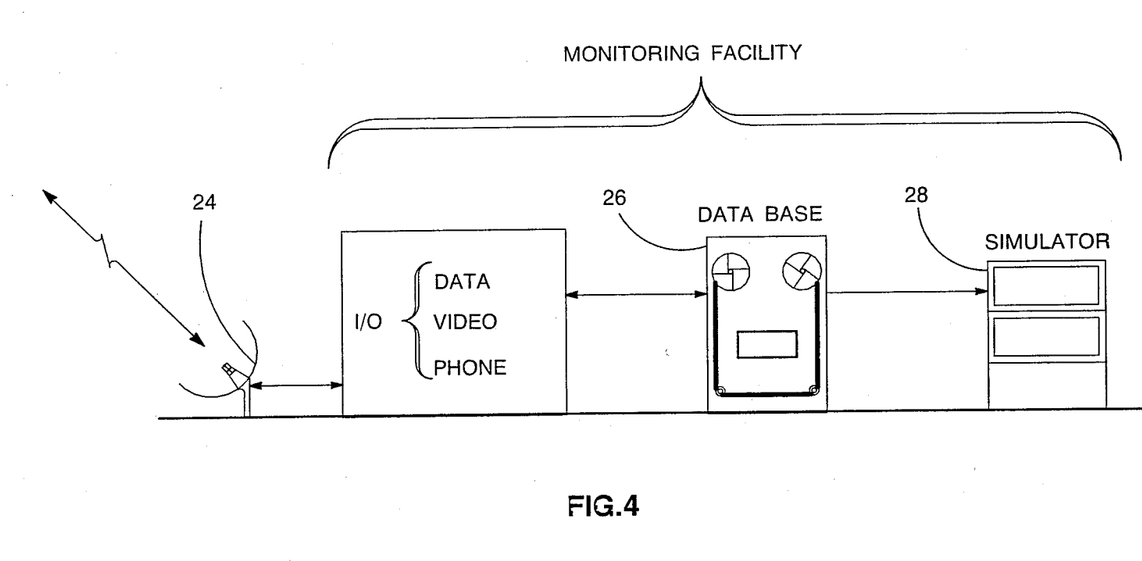
FIG. 4 is a semidiagrammatic elevational view of equipment utilized at a monitoring facility for use with one embodiment of the present invention.

As shown in FIG. 4, the data in the form of electronic signals in analog and/or digital format are sent from the well site to the monitoring facility 14 via a cooperable communication device, such as a satellite transceiver system 24. Certain portions of the data is fed provided to the monitoring facility 14 for display and use by the engineers, who are monitoring the drilling of the well. Other portions of the data is provided on a real time basis into a database 26, such as a tape, disk, or bubble memory, associated with an engineering simulator 28, such as the ESD.

In one form of the present invention, the remote operations facility 20 at the well site includes an electronics trailer and a separate satellite antenna trailer 22. The remote operations facility 20 serves to house the necessary computer communications equipment at the well site and also it serves as a workstation for the engineering personnel at the well site. In the remote operations facility 20, the drilling data collected from the well is first reviewed and, if desired, preprocessed before transmission to the monitoring facility 14. Further, the remote operations facility 20 includes graphical, audio, and visual two-way communications equipment for communication with the engineers at the monitoring facility 14.

The data entering the monitoring facility 20 comes from either the sensors on the well site or from the engineering representatives at the well site manually entering certain data. The manually entered data can be in a form format. For example, the forms that are to be completed by the engineering personnel include the daily drilling wire, drillstring composition, bit grade, casing, tubing and equipment tally, cementing, well site inventory, weekly well costs, engineering notebook, the material balance, rig equipment status, and the like. Well site personnel are capable of initiating the entry of this data using a computer terminal at the well site in the remote operations facility.

As shown earlier, the analog or digital signals from the sensors are fed into the logging unit 18, which does virtually all of any needed or desired preprocessing of the raw data before sending such data to the remote operating facility 20, where a validity check of the data, in record form, will note any bad sensors or any logs that are in error, and then periodically print out a record of the bad data received during a given time period.

A mini computer can be provided within the logging unit 18 for providing at least one full day of on-line buffer capacity but with the ability to buffer unlimited amounts of recording on nine-track tape. This buffering capability can be needed in the event the drilling data cannot be sent to the remote operating facility 20 or the monitoring facility 14 because of equipment failure or the like.

The data collected from both the analog or digital signal generating sensors and via entry is sent in data record format. Each sensor provides its signal to the logging unit 18 which transforms the signals into usable data records. Each data record can be identical in size and includes the necessary header information. The body of each record is tailored to capture the information about one specific rig activity or information requirement. Because each record has a different purpose, the frequency of transmission of the records to the remote operations facility 20 varies greatly. Depth records are generated every foot drilled, while solids control equipment records are generated only when an on/off status of a piece of equipment changes. All variable descriptions within the data records specify either an instantaneous reading or an average reading, with the average readings averaged over a given time period or event depending upon the type of record. For example, the drilling interval record is generated once per foot, therefore, the readings for the record are averaged over the 1 ft interval.

The following is a general description of some of the data records utilized in one embodiment of the present invention:

Well identification—this record is manually generated at the beginning of the well and it is stored usually on eight-track tape. Such well information includes well name, county name, field name, contractors name, rig number, ground level elevation, and the like.

Data Interval—This record is the depth interval generated each time a new foot (depth) is drilled, but can be increased from 5 to 10 or even every 30 feet in high penetration rate areas. Depth interval information can also include depth of hole interval, drilling time on bit, reaming time on bit, stand pipe pressure, hook load, weight on bit, RPM, amps (the amount of current drawn by the rotary table motor averaged over the drilling interval), rate of penetration, pump rate, flow in, flow out, mud weight in, mud weight out, bit number, plastic viscosity, and the like.

Bit—This record is generated manually at the beginning of the bit run, and another is generated after the bit is pulled. The variables in this record can include the bit number, the bit size, the bit manufacturer, the depth in, the depth out, the rate of penetration, and the feet drilled as well, jets utilized, and the like.

Lag Parameters—This record is a periodic record sent each time a lag drilling interval reaches the surface. Normally, such interval is 1 ft, but can be as many as 5 to 10 or even 30 ft intervals. This record is usually automatically generated and can include variables such as depth of sample, average gas, minimum gas, maximum gas, mud weight in, mud weight out, temperature in, temperature out, average sulfides content, lag volume, average methane, ethane, propane, butane contents, and the like.

Lithology—This record includes periodic records sent after each rock sample has been retrieved and described. Depths intervals are normally every 10 ft, but include, even in high penetration areas, anywhere between 30 and 40 ft intervals. Lithology variables include depth of sample, formation name, primary lithology present, primary lithology type, formation density, porosity, shale type, grain size, and the like.

Measurement-While-Drllling (MWD)—This record is generated on a real time or on a per-connection basis. Such MWD data includes sequence number, side track number, depth of bit, depth of gamma ray sensor, depth of directional sensor, inclination, direction, downhole weight on bit, downhole torque, gamma ray, resistivity, downhole fluid temperature, downhole annulus pressure, downhole interval pressure, downhole pressure drop, downhole mud weight, alternator voltage, and the like.

In one embodiment of the present invention, the data records are sent from the logging unit 18 in 400 ASCII byte records. Each record has up to 58 byte fields with each field containing 1 data value. All data records are capable of being stored on nine-track tape with either 2400 ft or minitapes type utilized and 6250 bytes per inch recording. In one embodiment of the present invention, the communication protocol between the logging unit 18 and the remote operations facility 20 and the monitoring facility 14 includes RS232 hardware link, asynchronous, 2400 baud, one start bit, eight data bits, no parody bit, two stop bits, and full duplex.

Figure 5:
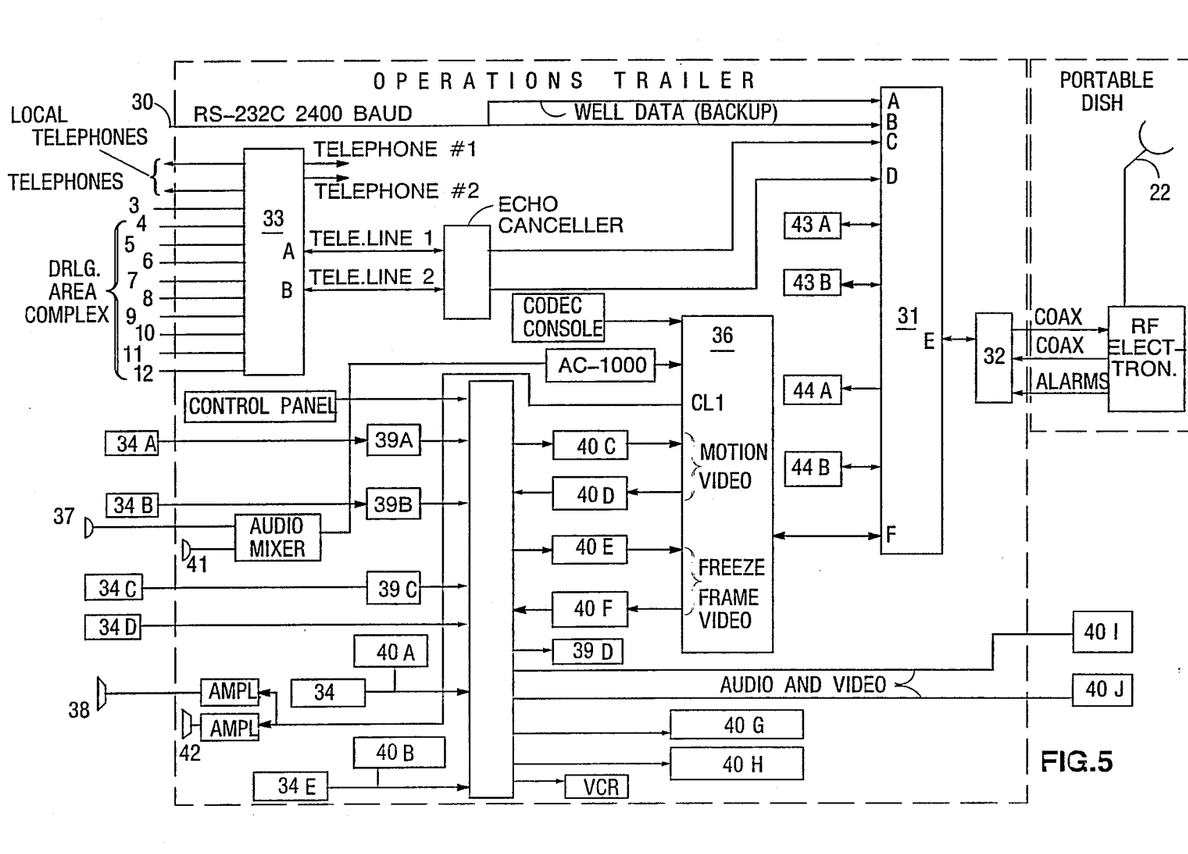
FIG. 5 is a schematic diagram of equipment utilized at a well site for use with one embodiment of the present invention.

FIG. 5 is a schematic diagram of the equipment utilized at the well site and referenced in Table I below where MWD data (if included) is fed through line 30 into a multichannel video and data multiplexer 34 and then through, in this particular case, a satellite modem 32 to a satellite communication system 22. Obviously, the modem 32 and the satellite communication system 22 can be replaced with other communication equipment if a hardwire connection, fiber optics, microwave or other radio communication systems are to be used between the well site and the monitoring facility 14. The telephones usually provided around the well site can be fed through a commercially available telephone exchange (PBX) 33 and then through a multiplexer 31 for two-way audio communication between the well site and the monitoring facility 14. The engineers at the monitoring facility 14 have a more thorough understanding of what is actually occurring at the well site because a plurality of cameras 34 are stationed around the well site. Such cameras 34 can be controlled from the well site or remotely from the monitoring facility 14 through a two-way video control unit 35, then through a full motion video or a freeze frame video controller 36, which connects to the multiplexer 31. To provide audio communication at the well site, a rig floor microphone 37 and a rig floor speaker 38 are utilized which connect through audio control equipment, as is well known, and then through the controller 36 and the multiplexer 31.

The remote operations facility 20 includes cooperable, and in some cases identical, monitoring/supervising equipment with that utilized in the monitoring facility 14. To provide the best possible supervision of the well drilling activity by the personnel on site, camera monitors 39, drill data graphic displays 40, and microphone(s) 41 and speaker(s) 42 are provided. The engineer in the remote operations facility 20 can be in audio, visual and graphical two-way communication with the engineers on the drill rig 10 and also with the monitoring facility 14. Further, if needed, the well site personnel can utilize the computers at the monitoring facility 14 or elsewhere via computer terminals 43 and printers 44, which are connected through the multiplexer 31.

At the monitoring facility 14, audio visual and graphic monitoring equipment are arranged so that virtually all drilling operations from one or more wells can be monitored.

TABLE I

| | | |
|---|---|---|
| 22 | = | 4.5 METER DISH |
| 30 | = | MUD WELL DATA |
| 31 | = | MULTIPLEXER |
| 31A | = | CH 1 ASYNC (2.4KB) |
| 31B | = | CH 9 SYNC (36.4KB) |
| 31C | = | CH 1 VOICE (19.2KB) |
| 31D | = | CH 3 VOICE (19.2KB) |
| 31E | = | VIDEO AND DATA |
| 31F | = | CH 8 SYNC (512KB) |
| 32 | = | SATELLITE MODEM |
| 33 | = | PBX |
| 33A | = | SATELLITE LINE 1 |
| 33B | = | SATELLITE LINE 2 |
| 34A | = | RIG FLOOR CAMERA 1 |
| 34B | = | RIG FLOOR CAMERA 2 |
| 34C | = | MUD PIT CAMERA |
| 34D | = | MOBIL CAMERA |
| 34E | = | ENGR. GRAPHICS CAMERA |
| 34F | = | ENGR. COMMUNICATION CAMERA |
| 35 | = | VIDEO CONTROL UNIT |
| 36 | = | CODEC |
| 37 | = | RIG FLOOR MICROPHONE |
| 38 | = | RIG FLOOR SPEAKER |
| 39A | = | RIG FLOOR CAMERA #1 MONITOR |
| 39B | = | RIG FLOOR CAMERA #2 MONITOR |
| 39C | = | MUD PIT CAMERA MONITOR |
| 39D | = | MOBIL CAMERA MONITOR |
| 40A | = | ENGR. GRAPHICS CAMERA MONITOR |
| 40B | = | ENGR. COMMUNICATION CAMERA MONITOR |
| 40C | = | FIELD ENGR. COMMUN. MONITOR |
| 40D | = | TRC ENGR. COMMUN. MONITOR |
| 40E | = | FIELD ENGR. GRAPHICS MONITOR |
| 40F | = | TRC ENGR. GRAPHICS MONITOR |
| 40G | = | VIDEO DISPLAY #2 (ENGR. GRAPHICS) |
| 40H | = | VIDEO DISPLAY #1 (ENGR. COMMUNICATION) |
| 40I | = | COMPANY MAN'S MONITOR |
| 40J | = | DOG HOUSE MONITOR |
| 41 | = | ENGR. WORKSTATION MICROPHONE |
| 42 | = | ENGR. WORKSTATION SPEAKER |
| 43A | = | CMS TERMINAL |
| 43B | = | SEL TERMINAL |
| 44A | = | OKIDATA PRINTER |
| 44B | = | PANAFAX MV3000 FACSIMILE |

Figure 6:
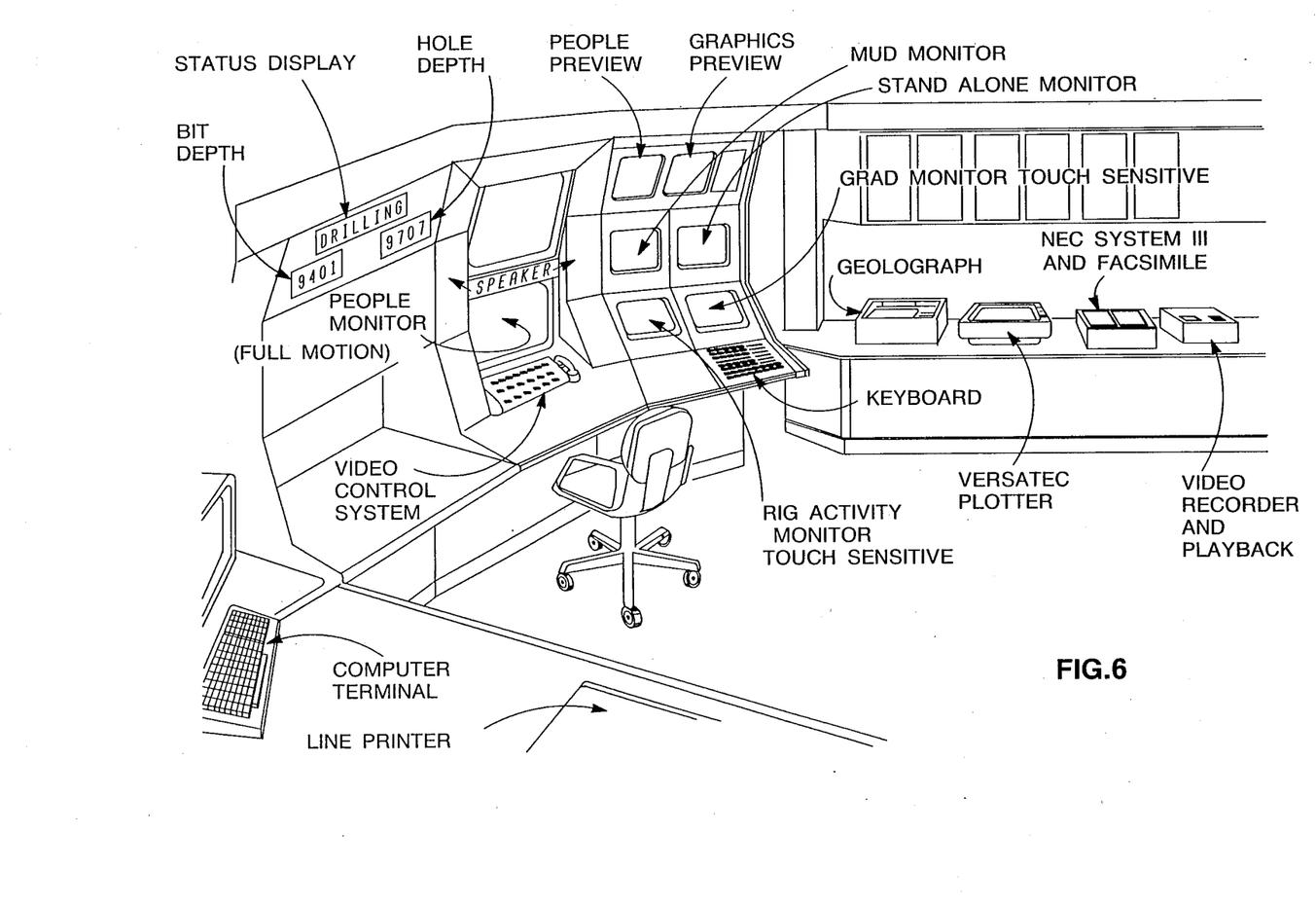
FIG. 6 is a perspective view of the interior of a monitoring facility of one embodiment of the present invention.
Figure 7:
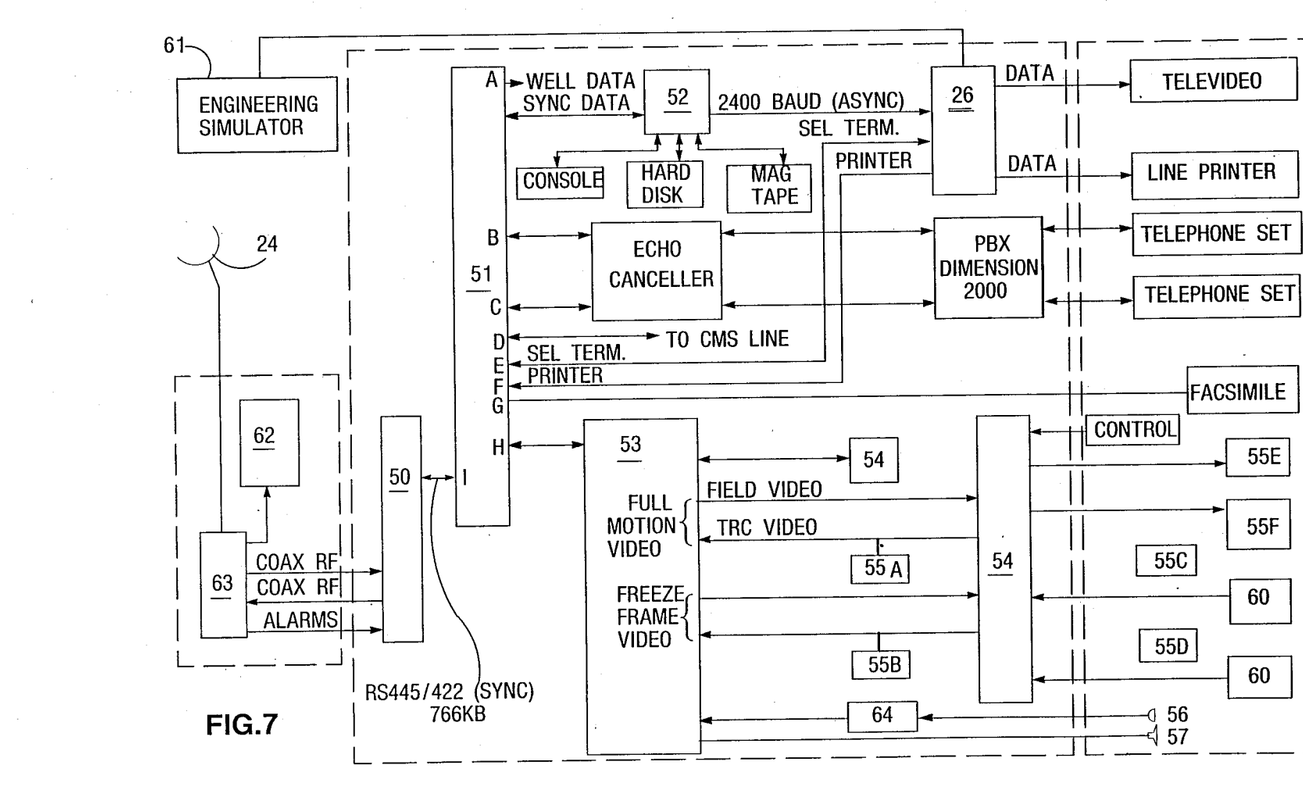
FIG. 7 is a schematic diagram of equipment utilized at a monitoring facility for use with one embodiment of the prssent invention.

Singularly or simultaneously, as shown in FIGS. 6 and 7 and referenced in Table II below, the data, as well as audio and visual information is sent from the well site and is received through a cooperable two-way communication system. As shown in FIG. 7, a satellite trans-receiver system 24 with a satellite modem 50 is used. Once received, the data is sent through a multiplexer 51 to a computer, which can act as a data buffer. In one embodiment, a PDP 11/23 programmable digital computer is utilized. The data is further sent to a database 26 associated with the main control and operations computer. In one embodiment, a SEL 87/86 can be utilized for the purpose. The audio, visual and graphical information is sent through a codec controller 53 and a video control unit 54 to a plurality of graphic and/or camera monitors 55. Further, microphone(s) 56, speakers 57, telephones 58, computer terminals or CRT's 59, and cameras 60 are provided to cooperate with the related equipment at the well site to provide two-way communication with the well site(s).

TABLE II

| | | |
|---|---|---|
| 24 | = | 10 METER DISH |
| 26 | = | SEL COMPUTER |
| 50 | = | SATELLITE MODEM |
| 51 | = | MULTIPLEXER |
| 51A | = | ASYNC CH1 (2.4KB) |
| 51B | = | VOICE CH2 (19.2KB) |
| 51C | = | VOICE CH3 (19.2KB) |
| 51D | = | ASYNC CH4 (4.8KB) |
| 51E | = | ASYNC CH5 (4.8KB) |
| 51F | = | ASYNC CH6 (2.4KB) |
| 51G | = | SYNC CH7 (4.8KB) |
| 51H | = | SYNC CH8 (512KB) |
| 51I | = | VIDEO AND DATA |
| 52 | = | POP 11/23 COMPUTER |
| 53 | = | CODEC |
| 54A | = | CLI SYSTEM CONSOLE |
| 54B | = | VIDEO CONTROL UNIT |
| 55A | = | TRC ENGR. COMMUNICATION MONITOR |
| 55B | = | TRC ENGR. GRAPHICS MONITOR |
| 55C | = | ENGR. GRAPHICS CAMERA MONITOR |
| 55D | = | ENGINEERING COMMUNICATION MONITOR |
| 55E | = | VIDEO DISPLAY #2 (ENGR. GRAPHICS) |
| 55F | = | VIDEO DISPLAY #1 (ENGR. COMMUNICATION) |
| 56 | = | MICROPHONE |
| 57 | = | SPEAKER |
| 58 | = | TELEPHONE SETS |
| 60 | = | ENGINEERING GRAPHICS CAMERA AND ENGR. COMMUNICATION CAMERA |
| 61 | = | ENGINEERING SIMULATOR |
| 62 | = | POLARAD SPECTRUM ANALYZER |
| 63 | = | R.F. ELECTRONICS |
| 64 | = | TELESYSTEMS AC-1000 ACCOUSTICAL ECHO CANCELLER |

The present invention provides a monitoring, supervision, and communication center where experts around the clock can monitor, advise, and supervise one or more wells that are being drilled. An important feature of the present invention is that color graphics are preferably ueed at the well site(s), the remote operations facility 20, and the monitoring facility 14 to display complex information in understandable form. Specifically, the graphics preferred are the same as used in the ESD, as described in the above mentioned papers.

All drilling data entering the monitoring facility 14 is checked on a real time basis for validity before being entered into the database 26. Each variable on every form or every data record is assigned a realistic range of values before starting the drilling operations. For instance, weight on bit might be present to be between 0–100,000 lbs. Therefore, anytime the weight on bit is outside of this range, an alarm is sounded at the monitoring facility 14 and the well site 10. This erroneous data record will not be entered into the database 26 before a check has been made to determine if such data is correct or the sensor, etc., has failed. All valid data entering the monitoring facilities' 14 database 26 is stored in the database according to record or form type. Therefore, it is possible to retrieve a complete record just as the record came in from the remote operating facility 14, on a real time basis.

As previously discussed, an engineering simulator, such as the ESD, 61 ss operatively connected to the database 26. All or a portion of the drilling data is provided on a real time basis into the database 26 and can be accessed or utilized by the engineering simulator 61 whenever desired. If the engineering simulator 61 was utilized in preparing the drilling plan for the well, the drilling plan file can be in storgge and can be retrieved for review when desired.

For a past drilling action to be reviewed or a future drilling action to be simulated using the engineering simulator 61, the database 26 (from which the engineering simulator 61 receives its data) is already updated with the actual data from the well that is to be simulated. Also, all other data from other wells is added into the database. In this manner, the engineering simulator 61 can provide the most accurate simulation possible (because it is using real data from the well) and on a very fast basis (because the data was and is provided on a real time basis into the database 26).

Now that the system has been described in detail, a more thorough understanding of the utilization and novelty of the present invention can be had. After the well plan has been developed, most of the controllable drilling equipment and operational parameters are specified. For example, decisions are made on what bit to run, what bit jets to use and what flow rates to use. Once the drilling operation has commenced, the decisions effecting the drilling operation of the well are made at the well site by the engineer. During the drilling operation, the drilling data is sent on a real time basis to the database 26 at the monitoring facility 14 and the audio, visual and other graphical data is separated out upon receipt and displayed for monitoring purposes at the monitoring facility 14. At the monitoring facility 14, the engineers can very closely monitor the well and can help make decisions.

In the event that a malfunction or a variance in the drilling plan occurs, then alarms or notices can be initiated. For example, alarms will sound if changes occur in pit volume, pit gain, pit loss, total gas content, torque variance, hook load variance, drilling break, tripping speed too fast, trip tank volume, and sulfides level. In the event that drilling or other operations at the well site are not proceeding as desired, then the engineer can be in immediate communication visually (face to face) and graphically, as well as audially with the monitoring facility to help make corrections. If the drilling cannot be proceeded as planned because of an equipment failure, encountering different lithologies or the like, then some change in the drilling action must be chosen. In the past, such changes would be based only upon the data either currently within the computers database, which was the same data that was inputted when the drilling plan was developed (i.e., it has not been updated on a real time basis) or by the engineer(s) with human limited capability of understanding all of the data that was accumulated up to this point in drilling the well.

By using the present invention, the drilling data generated during the drilling of the well is fed, all or in part, on a real time basis to a database in operable communication with the engineering simulator. Once corrective action is deemed necessary, a plan is devised by the engineer(s) to correct the problem at hand and can be simulated to ensure that such action will help rather than harm the operations. Once the simulations results are obtained, the engineer can determine whether or not this particular corrective action will solve the problem or not. Additional simulations can be made using different parameters, as is the case when developing the drilling plan. Once the "best" corrective action has been chosen, then this corrective action is communicated, visually, audially, and/or graphically to the well site.

The inventor hereof knows of no other method or system that provides a means for monitoring and supervising one or more wells using visual, audio, and graphical communication so that both the engineer at the monitoring facility and the well site personnel are in meaningful communication. Further, the inventor hereof knows of no other method or system that provides means for pooviding actual drilling data, on a real time basis, to a database for use in simulating future drilling actions. While well data from previous wells have been used in engineering simulator databases, no system can use well data received immediately prior to the simulation for use in simulating corrective actions on that well being drilled.

Whereas the present invention has been described in particular relation to the drawings attached hereto, it should be understood that other and further modifications, apart from those shown or suggested herein, may be made within the scope and spirit of the present invention.

What is claimed is:

1. A method of drilling a well with the aid of a predictive simulations, comprising:
   (a) collecting a plurality of signals at a well indicative of drilling related parameters;
   (b) providing the signals, on a real time basis, to a remotely located database associated with a programmable digital computer;
   (c) simulating future drilling actions for the well utilizing interactive simulation modules within the programmable digital computer and the drilling data; and
   (d) initiating a simulated drilling action at the well.

2. The method of claim 1 wherein the drilling data is provided by transmission methods selected from the group consisting of radio, microwave, hardwire connections, telephone, and optical fiber cable.

3. The method of claim 1 wherein step (a) comprises:
   collecting at the well, on a real time basis, a plurality of signals indicative of drilling related parameters,
   transmitting, on a real time basis, a portion or all of the plurality of signals from the at least one well to a remotely located database associated with a programmable digital computer, and
   loading, on a real time basis, the plurality of signals into the database associated with the programmable digital computer.

4. The method of claim 1 wherein the simulation in step (b) is accomplished utilizing interactive simulation modules within the digital computer.

5. The method of claim 4 wherein step (b) comprises:
   selecting an initial set of parameter changes that will affect drilling results,
   simulating future drilling utilizing the initial set of parameter chnges,
   determining if the drilling results are acceptable, if not selecting an additional set of parameter changes,
   simulating future drilling utilizing the additional set of parameter changes, and
   selecting the optimum set of parameter changes.

6. The method of claim 1 and including providing, on a real time basis, parameters associated with the drilling of the well to a remote monitoring facility.

7. A system for use in the drilling of a well, comprising:
   means for providing, on a real time basis, drilling data from at least one well being drilled into a database associated with a digital computer, and
   means for simulating future drilling actions for the well utilizing the digital computer and the drilling data within the database.

8. The system of claim 7 wherein the providing means is selected from the group consisting of radio transmissions means, microwave transmissions means, hard wire connections means, telephone, and optical fiber transmission means.

9. The system of claim 8 wherein the means for simulating comprises a dedicated programmable digital computer including means for interactively simulating changes in a plurality of drilling related parameters.

10. The system of claim 8 and including means for visually and graphically displaying on a real time basis parameter associated with the drilling of the well at a remote monitoring facility.

11. A method of drilling a well, comprising:
    (a) collecting at the well, on a real time basis, a plurality of signals indicative of drilling-related parameters;
    (b) transmitting, on a real time basis, a portion or all of the plurality of signals from at least one well to a remotely located database associated with a programmable digital computer;
    (c) loading, on a real time basis, the plurality of signals into the database associated with the programmable digital computer;
    (d) selecting an initial set of parameter changes that will affect drilling results;
    (e) simulating future drilling utilizing the initial set of parameter changes;
    (f) determining if the drilling results are acceptable, if not selecting an additional set of parameter changes;
    (g) simulating future drilling utilizing the additional set of parameter changes;
    (h) selecting the optimum set of parameter changes; and
    (i) initiating the optimum set of parameter changes at the well.

* * * * *